June 20, 1933. W. J. MARSH 1,914,750
METHOD OF PREPARING PHOSPHORUS PENTACHLORIDE
Filed June 30, 1930
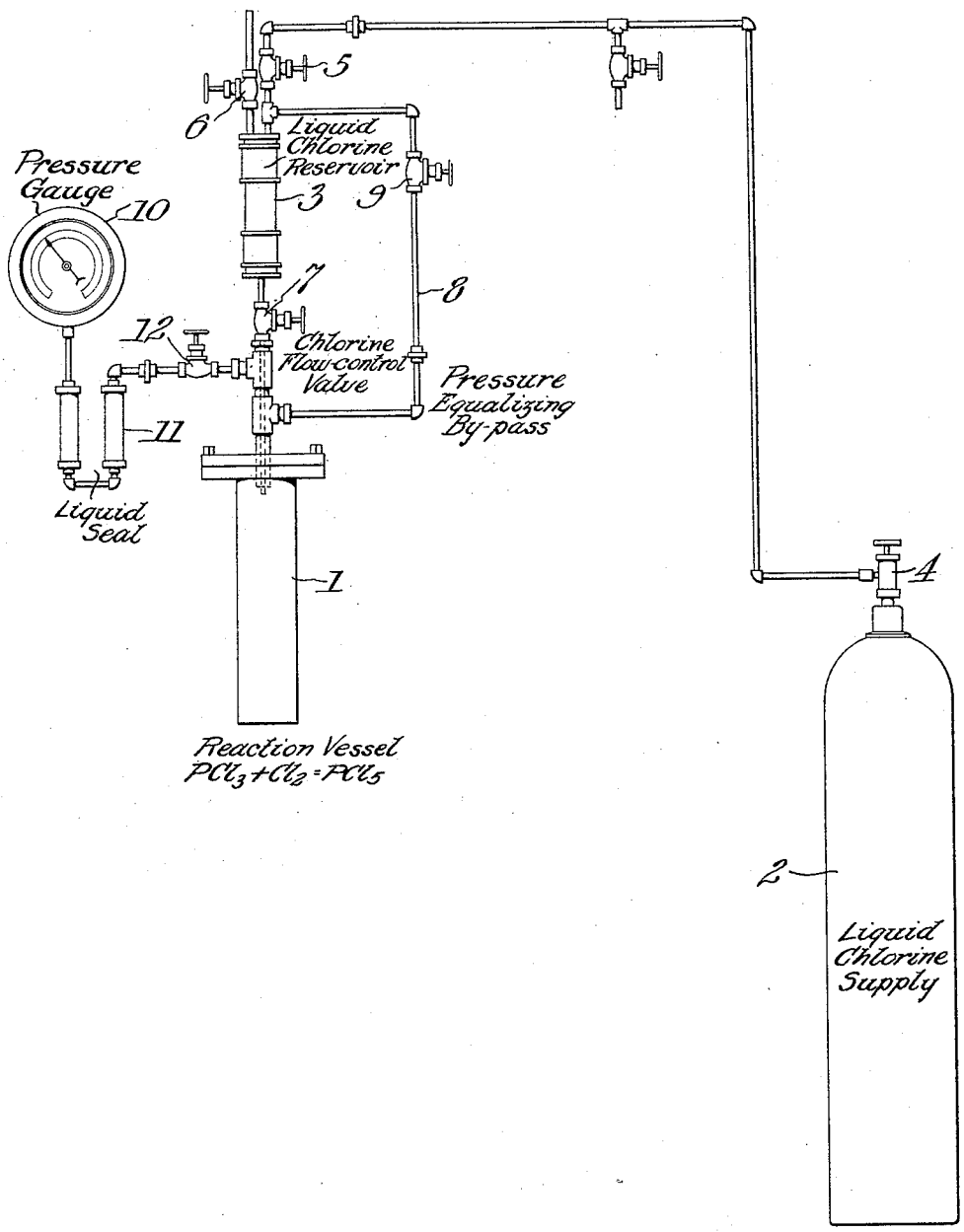

Patented June 20, 1933

1,914,750

UNITED STATES PATENT OFFICE

WILLIAM JUDSON MARSH, OF NIAGARA FALLS, NEW YORK, ASSIGNOR TO HOOKER ELECTROCHEMICAL COMPANY, OF NEW YORK, N. Y., A CORPORATION OF NEW YORK

METHOD OF PREPARING PHOSPHORUS PENTACHLORIDE

Application filed June 30, 1930. Serial No. 465,046.

This invention relates to the preparation of phosphorus pentachloride by combining phosphorus trichloride with liquid chlorine.

In the usual methods of preparing phosphorus pentachloride, chlorine is introduced into liquid phosphorus trichloride as a gas. This process is difficult and dangerous to carry out on account of the fact that the pentachloride, which separates out as a solid, tends to sublime and to plug up the chlorine inlet and the vent or exit of the vessel in which the reaction is carried out. As a result there is a tendency to build up pressure in the chlorine line and/or in the reactor vessel. When this pressure is suddenly released, the result may be almost explosive and involves danger to the operator.

I have found that the above-mentioned hazards may be eliminated and phosphorus pentachloride may be prepared simply, safely and efficiently by combining liquid chlorine with liquid phosphorus trichloride in an autoclave or other suitable pressure vessel under such conditions that there is no tendency for the pentachloride to sublime or plug up the equipment. Preferably, the reaction is carried out at a moderate temperature, say below 75° C., and under substantial pressure, say 140 lbs. per square inch, as under such conditions it is much easier to bring the reaction under control.

The process will be described in connection with a suitable apparatus which is diagrammatically illustrated in the single figure of the accompanying drawing, it being understood that the process is not limited to the details described nor to operation in the specific form of apparatus shown.

Referring to the drawing, phosphorus trichloride is introduced into the reactor 1. Liquid chlorine in the required amount is then transferred from the cylinder 2 into a reservoir 3 by manipulation of valves 4, 5 and 6. The liquid chlorine is allowed to drip slowly from the reservoir 3 into the reactor 1, the rate being controlled by regulation of valve 7. The by-pass pipe 8 and valve 9 are provided in order to equalize the pressures in the chlorine reservoir 3 and reactor 1. A pressure gauge 10 and a sulfuric acid seal 11 are connected to the pipe line between the chlorine reservoir and the reactor, the valve 12 being provided in order to protect the sulfuric acid seal and the pressure gauge from extreme pressure variations.

Care is taken to introduce the liquid chlorine at a slow steady rate. During the operation of the process, pressures up to about 140 lbs. may be encountered. Heat is liberated during the reaction, and temperatures as high as 75° C. may be reached. The amount of heat liberated may be estimated by watching the pressure variations. In case a faster rate of production is desired, this can be accomplished by water cooling the reactor 1 in any suitable manner.

I preferably employ phosphorus trichloride and chlorine in approximately equivalent proportions as indicated by the equation:

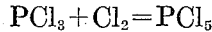

$$PCl_3 + Cl_2 = PCl_5$$

After the desired amount of chlorine has been introduced, the apparatus is allowed to stand until the pressure decreases to a minimum, and then any excess chlorine is blown off through valve 6. The product is then quickly removed from the reactor and is transferred to a hermetically tight drum, or other shipping container.

It is to be understood that I may introduce liquid chlorine into the reactor 1 and phosphorus trichloride into the reservoir 3 and allow the phosphorus trichloride to drip slowly into the liquid chlorine.

I claim:

1. The method of producing phosphorus pentachloride which comprises combining liquid chlorine with phosphorus trichloride.

2. The method of producing phosphorus pentachloride which comprises combining liquid chlorine with phosphorus trichloride under such conditions of temperature and pressure that the phosphorus pentachloride formed does not tend to sublime.

3. The method of producing phosphorus pentachloride which comprises combining liquid chlorine with phosphorus trichloride at a temperature below 75° C. and under pressures of about 140 lbs. per square inch.

4. The method of producing phosphorus pentachloride which comprises introducing liquid chlorine into phosphorus trichloride.

5. The method of producing phosphorus pentachloride which comprises introducing phosphorus trichloride into liquid chlorine.

In testimony whereof, I affix my signature.

WILLIAM JUDSON MARSH.